(12) United States Patent
Park et al.

(10) Patent No.: US 9,694,529 B2
(45) Date of Patent: Jul. 4, 2017

(54) EXTRUSION DIE FOR SYNTHETIC WOOD, MANUFACTURING APPARATUS AND METHOD USING THE SAME, AND SYNTHETIC WOOD MANUFACTURED BY THE SAME

(71) Applicant: LG HAUSYS, LTD., Seoul (KR)

(72) Inventors: Jong Sung Park, Daejeon (KR); Jung Il Son, Yongin-si (KR)

(73) Assignee: LG Hausys, Ltd., Seoul (KR)

( * ) Notice: Subject to any disclaimer, the term of this patent is extended or adjusted under 35 U.S.C. 154(b) by 398 days.

(21) Appl. No.: 14/380,300

(22) PCT Filed: Feb. 28, 2013

(86) PCT No.: PCT/KR2013/001677
§ 371 (c)(1),
(2) Date: Aug. 21, 2014

(87) PCT Pub. No.: WO2013/129887
PCT Pub. Date: Sep. 6, 2013

(65) Prior Publication Data
US 2015/0017387 A1  Jan. 15, 2015

(30) Foreign Application Priority Data
Feb. 28, 2012  (KR) ......................... 10-2012-0020363

(51) Int. Cl.
| | |
|---|---|
| B29C 47/04 | (2006.01) |
| B44F 9/02 | (2006.01) |
| B29C 47/56 | (2006.01) |
| B29C 47/82 | (2006.01) |
| B29C 47/92 | (2006.01) |
| B29C 47/12 | (2006.01) |
| B44F 9/04 | (2006.01) |
| B44F 9/00 | (2006.01) |

(Continued)

(52) U.S. Cl.
CPC .......... B29C 47/046 (2013.01); B29C 47/128 (2013.01); B29C 47/56 (2013.01);
(Continued)

(58) Field of Classification Search
CPC ..... B29C 47/043; B29C 47/046; B29C 47/56; B29C 45/1634; B29C 47/128;
(Continued)

(56) References Cited

U.S. PATENT DOCUMENTS 3,405,425 A * 10/1968 Buckley ................ B29C 47/046
156/100
3,432,885 A *  3/1969 Zanini ..................... B29C 47/28
425/191

(Continued)

FOREIGN PATENT DOCUMENTS

| CN | 101232987 A | 7/2008 |
|---|---|---|
| CN | 201645780 U | 11/2010 |

(Continued)

*Primary Examiner* — Jeffrey Wollschlager
(74) *Attorney, Agent, or Firm* — Dentons US LLP

(57) ABSTRACT

Disclosed therein are an extrusion die for synthetic wood which can provide a natural wood pattern similar with real wood by forming various wood patterns on the surface of synthetic wood manufactured through extrusion molding, manufacturing apparatus and method using the same, and synthetic wood manufactured by the same. The extrusion die includes: a pair of molds respectively having rectangular extrusion holes for allowing extrudates forming an inner layer to pass through the extrusion holes; and surface layer forming parts having flow paths which are oppositely formed on contact faces of the molds in such a way as to keep a predetermined gap and formed in a top and bottom asymmetrical manner for injecting other extrudates supplied, the surface layer forming parts serving to form a surface layer having different wood patterns on the outer circumference of the inner layer. The present invention can realize the natural wood pattern similar with real wood by forming various wood patterns on the surface of the synthetic wood by the extrusion die having an asymmetric flow path therein.

8 Claims, 4 Drawing Sheets

(51) Int. Cl.
*C11D 13/08* (2006.01)
*B28B 1/00* (2006.01)
*B29C 45/16* (2006.01)
*B29K 23/00* (2006.01)
*B29K 105/00* (2006.01)
*B29L 31/10* (2006.01)

(52) U.S. Cl.
CPC .......... *B29C 47/822* (2013.01); *B29C 47/92* (2013.01); *B44F 9/02* (2013.01); *B28B 1/005* (2013.01); *B29C 45/1634* (2013.01); *B29C 47/043* (2013.01); *B29C 2947/92695* (2013.01); *B29C 2947/92704* (2013.01); *B29K 2023/00* (2013.01); *B29K 2105/0032* (2013.01); *B29K 2995/002* (2013.01); *B29K 2995/0021* (2013.01); *B29L 2031/10* (2013.01); *B44F 9/00* (2013.01); *B44F 9/04* (2013.01); *C11D 13/08* (2013.01); *Y10T 428/24438* (2015.01)

(58) Field of Classification Search
CPC ............... B29C 47/92; B29C 47/822; B29C 2947/92704; B29C 2947/92695; B44F 9/00; B44F 9/02; B44F 9/04; B29K 2995/002; B29K 2995/0021; B29K 2105/0032; B29K 2023/00; C11D 13/08; C11D 13/18; B28B 1/005; B29L 2031/722; B29L 2031/10; Y10T 428/24438
USPC ................. 425/462; 264/73, 74, 75
See application file for complete search history.

(56) References Cited

U.S. PATENT DOCUMENTS

| | | | | | |
|---|---|---|---|---|---|
| 3,608,013 | A | * | 9/1971 | Ingham | B29C 47/046 264/173.18 |
| 3,770,357 | A | * | 11/1973 | Gibney | B29C 47/046 425/131.1 |
| 3,778,207 | A | * | 12/1973 | Luraschi | B29C 47/046 264/211.23 |
| 3,816,155 | A | * | 6/1974 | Iverson | B05D 5/061 427/274 |
| 4,185,951 | A | * | 1/1980 | Webermeier | B29C 47/046 425/133.5 |
| 4,626,187 | A | * | 12/1986 | Kamada | B29C 43/22 264/172.19 |
| 5,126,088 | A | | 6/1992 | Andres | |
| 5,209,282 | A | * | 5/1993 | Franco | B29C 47/003 160/236 |
| 5,897,708 | A | * | 4/1999 | Hsu | B05C 3/125 118/405 |
| 6,660,086 | B1 | * | 12/2003 | Prince | B05C 3/005 118/125 |
| 6,716,522 | B2 | * | 4/2004 | Matsumoto | B27N 3/28 264/173.16 |
| 6,783,348 | B2 | * | 8/2004 | Lee | B29C 47/0023 425/131.1 |
| 6,854,970 | B2 | * | 2/2005 | Keller | A23G 3/2015 425/131.1 |
| 7,661,945 | B2 | * | 2/2010 | Lipson | B29C 47/0023 425/131.1 |
| 8,734,909 | B2 | * | 5/2014 | Iyer | B05C 5/0241 118/405 |
| 2003/0057591 | A1 | * | 3/2003 | Lee | B29C 47/0023 264/171.13 |
| 2003/0091678 | A1 | * | 5/2003 | Jaffer | B29C 47/046 425/206 |
| 2009/0035581 | A1 | * | 2/2009 | Sudano | B05C 5/0241 428/421 |
| 2011/0223342 | A1 | * | 9/2011 | Iyer | B05C 5/0241 427/434.4 |

FOREIGN PATENT DOCUMENTS

| | | |
|---|---|---|
| EP | 1250995 A1 | 10/2002 |
| JP | 11-156819 A | 6/1999 |
| JP | 2000-239466 A | 9/2000 |

\* cited by examiner

[Fig. 1]
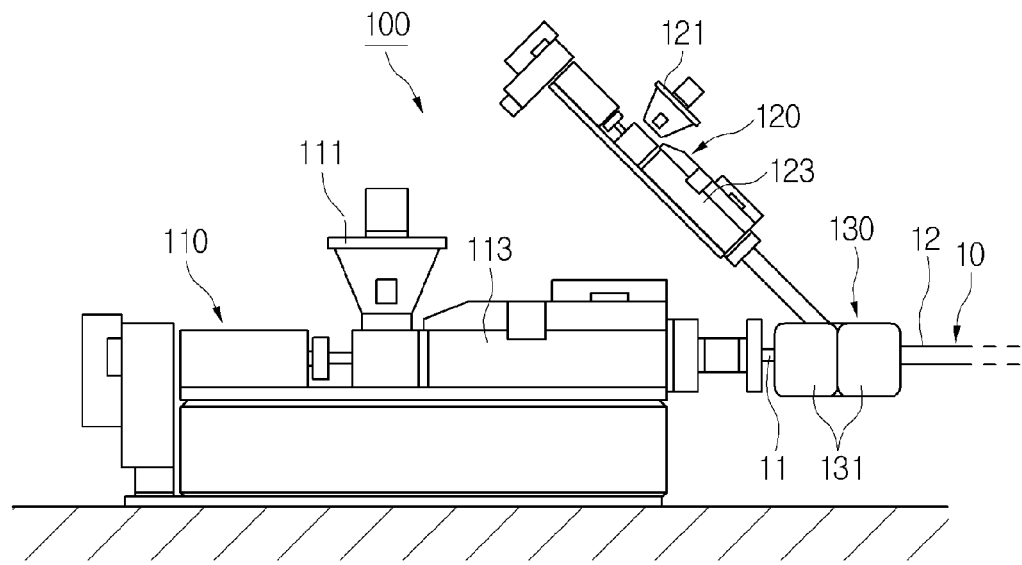
[Fig. 2]
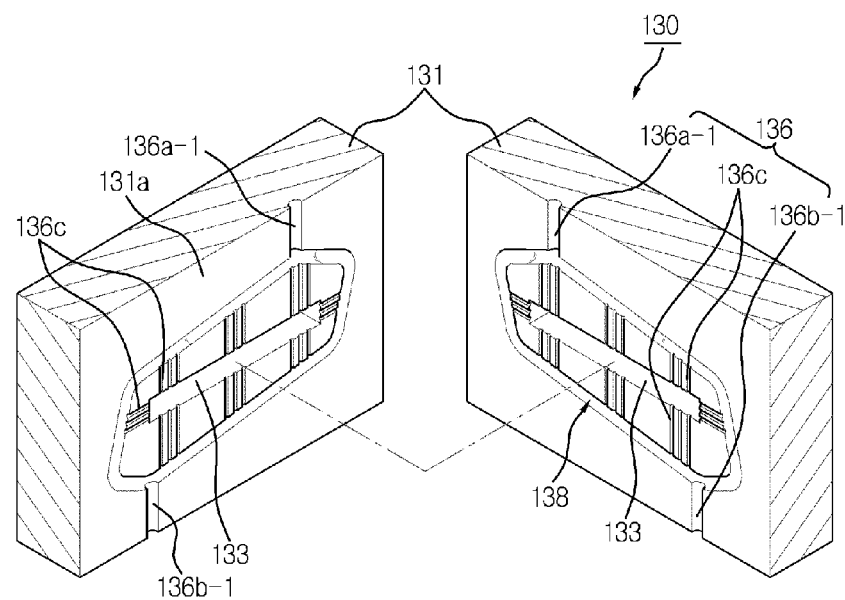

[Fig. 3]
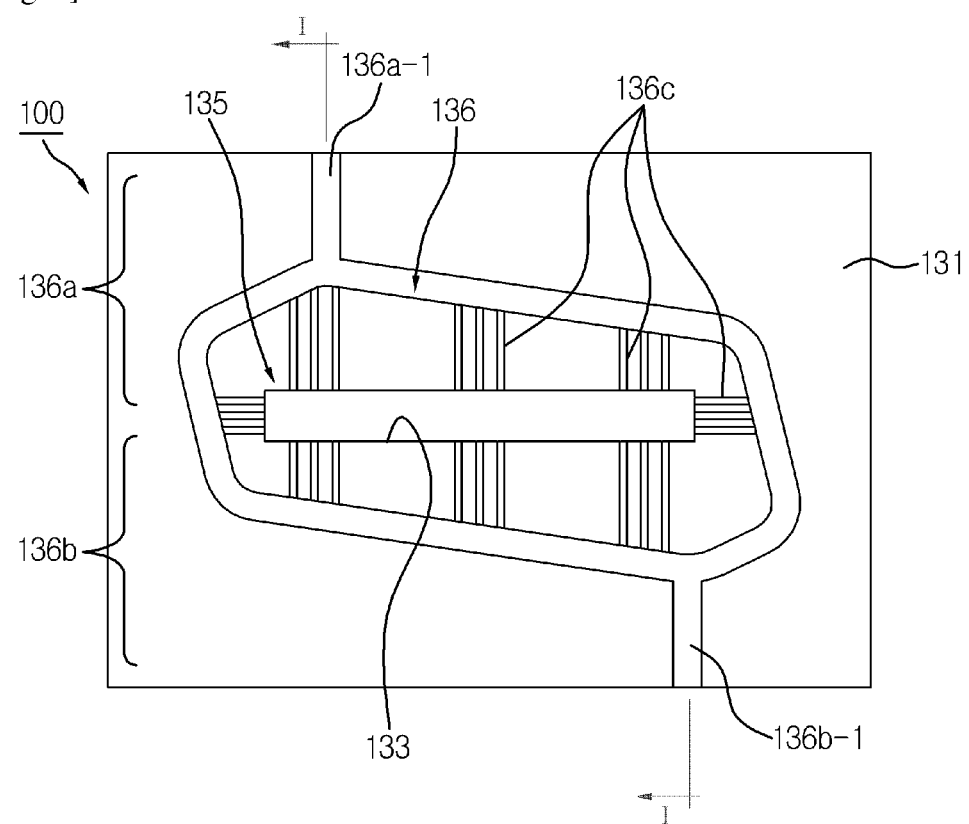

[Fig. 4]
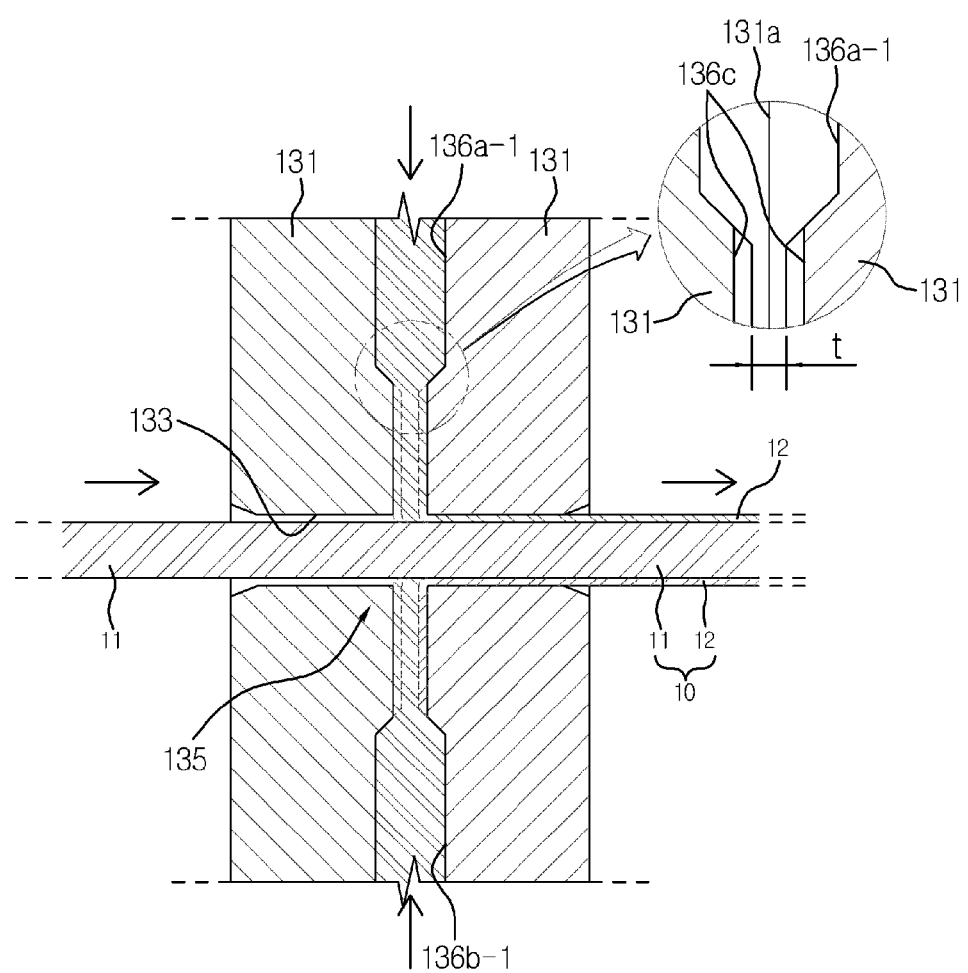

[Fig. 5]
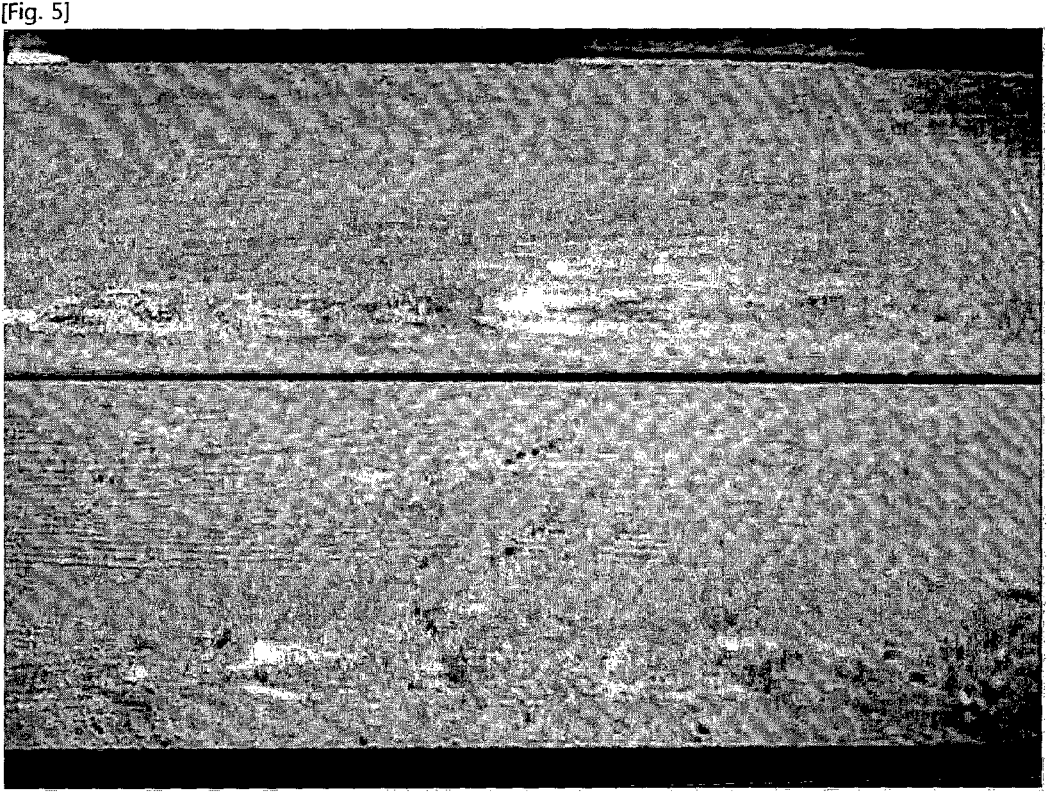

EXTRUSION DIE FOR SYNTHETIC WOOD, MANUFACTURING APPARATUS AND METHOD USING THE SAME, AND SYNTHETIC WOOD MANUFACTURED BY THE SAME

This application is a National Stage Entry of International Application No. PCT/KR2013/001677, filed on Feb. 28, 2013, which claims the benefit of Korean Application No. 10-2012-0020363, filed on Feb. 28, 2012, which are hereby incorporated by reference in their entirety for all purposes as if fully set forth herein.

TECHNICAL FIELD

The present invention relates to synthetic wood, and more particularly, to an extrusion die for synthetic wood which can form various patterns on the surface of the synthetic wood, manufacturing apparatus and method using the same, and synthetic wood manufactured by the same.

BACKGROUND ART

Recently, there are many studies on synthetic wood having surface texture and patterns similar with natural timber. The synthetic wood has the external appearance or properties similar with natural timber because it contains lots of wood flour, and is manufactured through injection molding or extrusion molding.

A plastic material used for the injection molding or the extrusion molding is mainly polyolefin, such as polyethylene (PE) and polypropylene (PP), because polyolefin which is nontoxic is suitable for synthetic wood carrying the banner for eco-friendly material, and is manufactured through injection molding or extrusion molding. Because the injection-molded product is engraved or has the grain of wood at the time of molding, it can express the texture of wood without the secondary process such as printing or painting.

The extrusion-molded product is similar to material, slab, or lumber of wood, and is mainly used for building materials.

Synthetic wood is generally lower in absorptiveness than natural timber and is uncorrupted. Moreover, the synthetic wood is very high in intensity and is favorable for processing such as nailing or planning because it is relatively lower in foaming magnitude and has an outer layer with high density.

Because the synthetic wood has strong and excellent physical properties and is eco-friendly and renewable, it has been seeing rapid growth in its market as a new material replacing natural wood, and synthetic wood products of various forms have been developed.

In the meantime, most of conventional synthetic woods are manufactured by a method of expressing patterns through a mechanical postprocess, and are sometimes manufactured by a method of expressing patterns using pigments.

However, most of the conventional extrusion-molded synthetic wood products have a problem in that they cannot realize actual patterns, such as waves, lines, oblique lines, dotted lines, of the real high-quality wood because they have solid color and monotonous patterns.

Accordingly, in order to express some pattern, a wooden pattern master batch is put in the middle of an extruder, but it is difficult to realize the natural pattern of real wood.

DISCLOSURE OF INVENTION

Technical Problem

Accordingly, the present invention has been made in an effort to solve the above-mentioned problems occurring in the prior arts, and it is an object of the present invention to provide an extrusion die for synthetic wood which can provide a natural wood pattern similar with real wood by forming various wood patterns on the surface of synthetic wood manufactured through extrusion molding, manufacturing apparatus and method using the same, and synthetic wood manufactured by the same.

Solution to Problem

To achieve the above objects, the present invention provides an extrusion die including: a pair of molds respectively having rectangular extrusion holes for allowing extrudates forming an inner layer to pass through the extrusion holes; and surface layer forming parts having flow paths which are oppositely formed on contact faces of the molds in such a way as to keep a predetermined gap and formed in a top and bottom asymmetrical manner for injecting other extrudates supplied, the surface layer forming parts serving to form a surface layer having different wood patterns on the outer circumference of the inner layer.

Each of the flow paths includes: a first injection portion formed on one side of an upper part based on the vertical center of the extrusion hole, and a second injection portion formed on the other side below the extrusion hole and formed top-bottom asymmetrically with the first injection portion.

Moreover, a plurality of injection grooves are formed on the opposed contact faces of the molds, which form the gap inside the first and second injection portions, along the border of the extrusion hole in such a way as to be spaced apart from each other, so that unmelted and stagnant pigment chips with different colors contained in the extrudates can be injected.

Furthermore, the injection grooves are larger in diameter than the gap of the molds.

In another aspect of the present invention, the present invention provides a synthetic wood manufacturing apparatus including: a main extruder having a heating cylinder for dissolving raw materials put in through a hopper by heat of a heater and an extrusion screw for extruding the dissolved raw materials inside the heating cylinder; an auxiliary extruder having a heating cylinder for dissolving raw materials put in through a hopper by heat of a heater and an extrusion screw for extruding the dissolved raw materials inside the heating cylinder; and an extrusion die including: a pair of molds respectively having rectangular extrusion holes for allowing the inner layer extruded through the main extruder to pass through the extrusion holes; and surface layer forming parts respectively having flow paths which are oppositely formed on contact faces of the molds in such a way as to keep a predetermined gap and formed in a top and bottom asymmetrical manner for injecting the extrudates supplied through the auxiliary extruder, the surface layer forming parts serving to form a surface layer having different wood patterns on the outer circumference of the inner layer.

In a further aspect of the present invention, the present invention provides a synthetic wood manufacturing method including the steps of: dissolving raw materials put into a hopper of a main extruder by heat of a heater inside a heating cylinder and extrusion-molding an inner layer by supplying the dissolved raw materials into an extrusion head of the front end through an extrusion screw; dissolving raw materials put into a hopper of an auxiliary extruder by heat of a heater inside a heating cylinder and carrying out extrusion molding by supplying the dissolved raw materials into an extrusion head of the front end through an extrusion screw; and passing the inner layer, which is extrusion-molded through the main extruder, through an extrusion hole of an extrusion die, and injecting the extrudates, which are supplied through the auxiliary extruder, onto the outer circumference of the inner layer through flow paths formed top-bottom asymmetrically so as to form a surface layer with different wood patterns.

Moreover, the extrudates supplied through the auxiliary extruder contain at least two kinds of plasticized thermoplastic polymer resins and pigment chips, which have different melting temperatures, melt viscosities, and colors.

Furthermore, the pigment chips with different colors which are contained in the extrudates supplied through the auxiliary extruder and are unmelted and stagnant at one side of the flow path form various patterns, such as waves (crowns), straight lines, dotted lines, or oblique lines, on the surface layer while being injected through a plurality of injection grooves which are spaced apart from each other inside the flow path.

The synthetic wood according to the present invention is manufactured by the above-mentioned manufacturing method.

Advantageous Effects of Invention

The present invention can realize the natural wood pattern similar with real wood by forming various wood patterns on the surface of the synthetic wood by the extrusion die having an asymmetric flow path therein.

BRIEF DESCRIPTION OF DRAWINGS

FIG. 1 is a configurative diagram showing a general structure of a synthetic wood manufacturing apparatus according to the present invention.

FIG. 2 is an exploded perspective view of an extrusion die for manufacturing synthetic wood according to the present invention.

FIG. 3 is a side view showing an interior structure of the extrusion die according to the present invention.

FIG. 4 is a sectional view taken along the line of I-I of FIG. 3 showing a state where the extrusion die is joined and showing a condition of a surface layer formed on the outer circumference of an inner layer.

FIG. 5 is a photograph showing synthetic wood realizing a wood pattern according to the present invention.

MODE FOR THE INVENTION

Reference will be now made in detail to the preferred embodiment of the present invention with reference to the attached drawings.

In the drawings, the same components have the same reference numerals even though they are illustrated in different figures.

FIG. 1 is a configurative diagram showing a general structure of a synthetic wood manufacturing apparatus according to the present invention, FIG. 2 is an exploded perspective view of an extrusion die for manufacturing synthetic wood according to the present invention, FIG. 3 is a side view showing an interior structure of the extrusion die according to the present invention, FIG. 4 is a sectional view taken along the line of I-I of FIG. 3 showing a state where the extrusion die is joined and showing a condition of a surface layer formed on the outer circumference of an inner layer, and FIG. 5 is a photograph showing synthetic wood realizing a wood pattern according to the present invention.

Referring to FIG. 1, a synthetic wood manufacturing apparatus 100 according to a preferred embodiment for manufacturing synthetic wood 10, which contains extrudates for an inner layer 11 and a surface layer 12, includes a main extruder 110, an auxiliary extruder 120, and an extrusion die 130.

The main extruder 110 serves to form the inner layer 11 of the synthetic wood. Here, preferably, the main extruder 110 includes: a heating cylinder 113 for dissolving raw materials put in through a hopper 111 by heat of a heater; and an extrusion screw (not shown) for extruding the dissolved raw materials inside the heating cylinder 113.

The auxiliary extruder 120 serves to provide extrudates to form the surface layer 12 of a predetermined thickness onto the outer circumference of the inner layer 11 extruded by the main extruder 110. Here, preferably, the auxiliary extruder 120 includes: a heating cylinder 123 for dissolving raw materials put in through a hopper 121 by heat of a heater; and an extrusion screw (not shown) for extruding the dissolved raw materials inside the heating cylinder 123. In this case, the extrudates supplied through the auxiliary extruder 120 contain at least two kinds of plasticized thermoplastic polymer resin and pigment chips, which have different melting temperatures, melt viscosities, and colors to realize various colors and wood patterns on the surface layer 12.

The extrusion die 130 receives extrudates containing pigment chips with different colors from the auxiliary extruder 120, and forms the surface layer 12 of a predetermined thickness on the outer circumference of the inner layer 11 extruded and transferred through the main extruder 110, and at the same time, realizes various colors and wood patterns on the surface layer 12.

Referring to FIGS. 2 and 3, a structure of the extrusion die 130 will be described in detail. The extrusion die 130 includes: a pair of molds 131 respectively having rectangular extrusion holes 133 for allowing the inner layer 11 extruded through the main extruder 110 to pass through the extrusion holes 133; and surface layer forming parts 135 respectively having flow paths 136 which are oppositely formed on contact faces 131a of the molds 131 in such a way as to keep a predetermined gap (t) and formed in a top and bottom asymmetrical manner for injecting the extrudates supplied through the auxiliary extruder 120. For convenience, in the drawings, a packing or gasket which is interposed between the contact faces 131a of the molds 131 to keep sealability are omitted.

Here, preferably, each of the flow paths 136 includes: a first injection portion 136a including a first injection hole 136a-1 formed on one side of an upper part based on the vertical center of the extrusion hole 133, and a second injection portion 136b including a second injection hole 136b-1 formed on the other side below the extrusion hole 133 and formed top-bottom asymmetrically with the first injection portion 136a. (If the first and second injection portions 136a and 136b are formed top-bottom symmetrically on the same vertical line, uniform wood patterns, i.e. crown pattern are formed on the outer circumference of the inner layer 11.)

For reference, the first injection portion 136a means the entire flow path 136 formed above the extrusion hole 133, and the second injection portion 136b means the entire flow path 136 formed below the extrusion hole 133.

In this instance, the opposed contact faces forming the contact gap (t) inside the first and second injection portions 136a and 136b respectively have a plurality of injection grooves 136c for allowing a worker to inject pigment chips of different colors which are contained in the extrudates supplied into the first and second injection portions 136a and 136b and are not melted and are stagnant. Here, preferably, a plurality of the injection grooves 136c are formed along the border of the extrusion hole 133 in such a way as to be spaced apart from each other and are larger in diameter, one and a half times or two times larger, than the contact gap (t) of the mold 131.

Such flow paths 136 are top-bottom asymmetrical, and hence, the extrudates supplied through the first and second injection portions 136a and 136b flow irregularly inside the flow paths 136. Furthermore, as shown in FIG. 4, while the extrudates are injected through the contact gap (t), the surface layer 12 of a predetermined thickness (about 1 mm) is formed on the outer circumference of the inner layer 11 with a thickness of about 20 mm which passes through the extrusion hole 133.

In this instance, the unmelted pigment chips which do not pass through the gap (t) of the molds 131 because having particles larger than the gap (t) and are stagnant in sides of the first and second injection portions 136a and 136b are smoothly injected into the extrusion hole 133 through the injection grooves 136c.

Referring to FIG. 5, the extrudates containing the unmelted pigment chips injected through the injection grooves 136c form various irregular patterns, such as waves (crowns), straight lines, dotted lines, oblique lines, or others, on the surface layer 12. That is, synthetic wood having the surface layer 12 with wood patterns similar with natural wood.

Now, a synthetic wood manufacturing method using the synthetic wood manufacturing apparatus according to the present invention will be described.

First, raw materials put in the hopper 111 of the main extruder 110 are dissolved by heat of the heater inside the heating cylinder 113, and the dissolved raw materials are supplied to an extrusion head disposed at the front end through the extrusion screw so as to extrusion-mold the inner layer 11.

At the same time, raw material put into the hopper 121 of the auxiliary extruder 120 are dissolved by heat of the heater inside the heating cylinder 123, and the dissolved raw materials are supplied to an extrusion head disposed at the front end through the extrusion screw so as to carry out extrusion molding.

The inner layer extrudates extruded through the main extruder 110 pass through the extrusion hole 133 of the extrusion die 130, and the extrudates extruded through the auxiliary extruder 120 are injected onto the outer circumference of the inner layer 11, which passes through the extrusion hole 133, through the flow paths 136 which are formed top-bottom asymmetrically, so that the surface layer 12 having different wood patterns is formed to the predetermined thickness.

In this instance, the extrudates injected through the flow paths 136 contain a plurality of unmelted pigment chips with different colors, and the pigment chips form the surface layer 12 with various patterns, such as waves (crowns), straight lines, dotted lines, or oblique lines while being injected through a plurality of the injection grooves 136c spaced apart from each other inside the flow paths 136.

The synthetic wood having the wood patterns through the above manufacturing process is manufactured after postprocesses, such as cooling, cutting, and others.

While the present invention has been particularly shown and described with reference to the preferable embodiment thereof, it will be understood by those of ordinary skill in the art that the present invention is not limited to the above embodiment and various changes may be made therein without departing from the technical idea of the present invention.

EXPLANATION OF ESSENTIAL REFERENCE NUMERALS IN DRAWINGS

10: synthetic wood 11: inner layer
12: surface layer
100: synthetic wood manufacturing apparatus
110: main extruder 120: auxiliary extruder
130: extrusion die 131: mold
131a: contact face 133: extrusion hole
135: surface layer forming part
136: flow path 136a: first injection portion
136b: second injection portion
136c: injection groove

The invention claimed is:

1. An extrusion die comprising:
a pair of molds respectively having rectangular extrusion holes for allowing extrudates forming an inner layer to pass through the extrusion holes; and
surface layer forming parts having flow paths which are oppositely formed on contact face of the molds in such a way as to keep a predetermined gap and formed in a top and bottom asymmetrical manner for injecting other extrudates supplied, the surface layer forming parts serving to form a surface layer having different wood patterns on the outer circumference of the inner layer,
wherein each of the flow paths comprises: a first injection portion formed on one side of an upper part based on the vertical center of the extrusion hole, and a second injection portion formed on the other side below the extrusion hole and formed top-bottom asymmetrically with the first injection portion.

2. The extrusion die according to claim 1, wherein a plurality of injection grooves are formed on the opposed contact faces of the molds, which form the gap inside the first and second injection portions, along the border of the extrusion hole in such a way as to be spaced apart from each other, so that unmelted and stagnant pigment chips with different colors contained in the extrudates can be injected.

3. The extrusion die according to claim 2, wherein the injection grooves are larger in diameter than the gap of the molds.

4. A synthetic wood manufacturing apparatus comprising:
a main extruder having a heating cylinder for dissolving raw materials put in through a hopper by heat of a heater and an extrusion screw for extruding the dissolved raw materials inside the heating cylinder;
an auxiliary extruder having a heating cylinder for dissolving raw materials put in through a hopper by heat of a heater and an extrusion screw for extruding the dissolved raw materials inside the heating cylinder; and
an extrusion die including: a pair of molds respectively having rectangular extrusion holes for allowing the inner layer extruded through the main extruder to pass through the extrusion holes; and surface layer forming parts respectively having flow paths which are oppositely formed on contact faces of the molds in such a way as to keep a predetermined gap and formed in a top and bottom asymmetrical manner for injecting the extrudates supplied through the auxiliary extruder, the surface layer forming parts serving to form a surface layer having different wood patterns on the outer circumference of the inner layer, wherein each of the flow paths comprises: a first injection portion formed on one side of an upper part based on the vertical center of the extrusion hole, and a second injection portion formed on the other side below the extrusion hole and formed top-bottom asymmetrically with the first injection portion.

5. A synthetic wood manufacturing method comprising the steps of:

dissolving raw materials put into a hopper of a main extruder by heat of a heater inside a heating cylinder and extrusion-molding an inner layer by supplying the dissolved raw materials into an extrusion head through an extrusion screw;

dissolving raw materials put into a hopper of an auxiliary extruder by heat of a heater inside a heating cylinder and carrying out extrusion molding by supplying the dissolved raw materials into an extrusion head through an extrusion screw; and passing the inner layer, which is extrusion-molded through the main extruder, through an extrusion hole of the extrusion die of claim 1, and injecting the extrudates, which are supplied through the auxiliary extruder, onto the outer circumference of the inner layer through flow paths formed top-bottom asymmetrically so as to form a surface layer with different wood patterns.

6. The synthetic wood manufacturing method according to claim 5, wherein the extrudates supplied through the auxiliary extruder contain at least one or more plasticized thermoplastic polymer resins and at least one or more pigment chips, wherein the plasticized thermoplastic polymer resins and the pigment chips have respectively different melting temperatures, melt viscosities, and colors.

7. The synthetic wood manufacturing method according to claim 6, wherein the pigment chips having respectively different colors which are contained in the extrudates supplied through the auxiliary extruder and are unmelted and stagnant at one side of the flow path forms various patterns on the surface layer while being injected through a plurality of injection grooves which are spaced apart from each other inside the flow path.

8. The synthetic wood manufacturing method according to claim 7, wherein the various patterns comprise waves, straight line, dotted lines, oblique lines or a combination thereof.

* * * * *